United States Patent [19]

Huth

[11] Patent Number: 4,521,031
[45] Date of Patent: Jun. 4, 1985

[54] TWO-WHEELED VEHICLE KICKSTAND SUPPORT PAD

[76] Inventor: Robert M. Huth, 3480 Mirror La., Cincinnati, Ohio 45211

[21] Appl. No.: 472,584

[22] Filed: Mar. 7, 1983

[51] Int. Cl.³ .............................................. B62H 1/02
[52] U.S. Cl. ..................................... 280/293; 280/301
[58] Field of Search ................ 280/293, 295, 298, 301

[56] References Cited

U.S. PATENT DOCUMENTS

| | | | |
|---|---|---|---|
| 2,835,508 | 5/1958 | Wood et al. | 280/301 |
| 3,955,829 | 5/1976 | Bussler | 280/293 |
| 3,970,330 | 7/1976 | Norcross | 280/301 |

Primary Examiner—Joseph F. Peters, Jr.
Assistant Examiner—Donn McGiehan
Attorney, Agent, or Firm—Kinney and Schenk

[57] ABSTRACT

A support pad or standpad for maintaining a two-wheeled vehicle having a kickstand in the upright position when placed between the two-wheeled vehicle kickstand and a soft supporting surface. The standpad consists of a thin planar member having flat surfaces. Means for reinforcing the planar member are distributed throughout the member. An aperture is cut through the thin planar member and is connected to the periphery of the thin planar member by a slit. The aperture and slit allow the standpad to be stored on a convenient cable or loop such as the speedometer cable or clutch cable on top of the transmission or a cord or leather loop conveniently located on the two-wheeled vehicle. During normal operations on soft supporting surfaces, the standpad is placed between the vehicle's kickstand and the soft supporting surface to prevent the kickstand from penetrating the soft supporting surface and thereby preventing the vehicle from toppling over.

8 Claims, 5 Drawing Figures

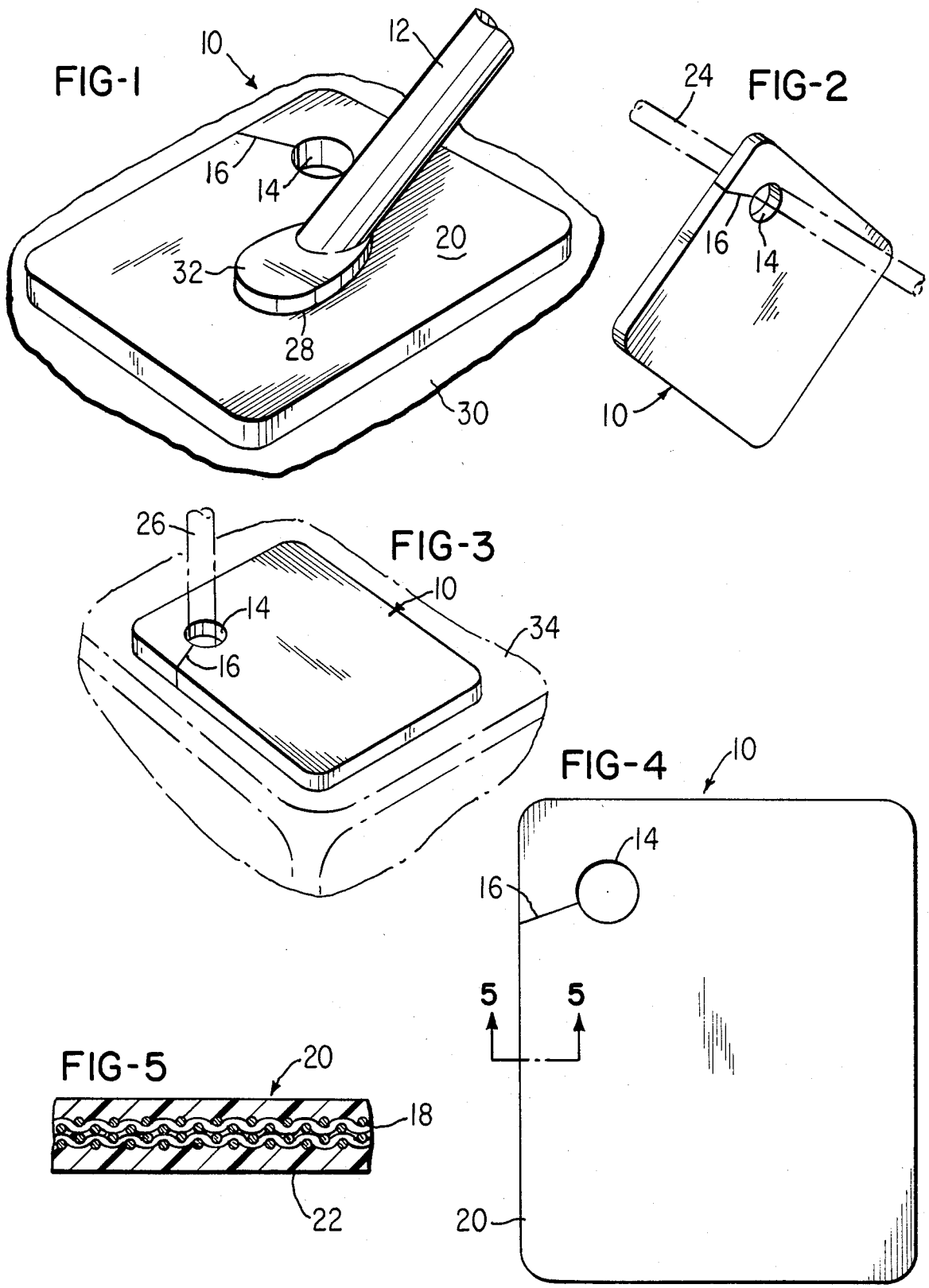

TWO-WHEELED VEHICLE KICKSTAND SUPPORT PAD

BACKGROUND OF THE INVENTION

1. Field of the Invention

The present invention relates to a device for maintaining two-wheeled vehicles in the upright position when parked on soft surfaces and more particularly to a support pad positioned between the soft surface and the two-wheeled vehicle kickstand.

2. Description of the Prior Art

It has been known in the prior art to use kickstands, either pivoted or folding, on both bicycles and motorcycles for years. These prior art devices have had the common disadvantage when using the kickstand to hold a two-wheeled vehicle in an upright position on soft or uneven ground or surfaces such as plowed ground, mud, sandy soil, lawn or turf, beach or desert sand or sun warmed asphalt of having the two-wheeled vehicles kickstand tend to sink into the soft surface thereby causing an increasing angle of inclination of the two-wheeled vehicle in relationship to the ground such that the center of gravity of the two-wheeled vehicle reaches the point where the two-wheeled vehicle topples over. This disadvantage possibly causes damage to the vehicle and its accessories. Additionally, larger two-wheeled vehicles such as large motorcycles are physically difficult to return to the upright position after toppling over.

While these prior art devices obviated the necessity for finding a leaning place for the two wheeled vehicle when such ground conditions as those set forth above were encountered, it is necessary to obviate the necessity for the required means for attaching the device to the kickstand or the bosslike projection extending upward from one side of the support pad from the top surface of the support pad which served as a socket for receiving the end of the kickstand which allowed the kickstand to be attached to the support pad for use on such soft surfaces.

The present invention obviates the necessity of providing such attachment means for the support pad to the kickstand during utilization of the support pad. This inadequate combination of kickstand and support pad is made adequate by the elimination of the bosslike projection and sleeve and the addition of a retaining means for storing the support pad on the two wheeled vehicle when not in use. The present invention provides a support pad easily stored in various locations on all two-wheeled vehicles when not in use. Additionally, the support pad is easily positioned with either side contacting either the soft surface or the kickstand thereby effectively eliminating shank penetration into the soft surface and thus maintaining the two-wheeled vehicle in the upright position. One model of this particular support pad accomodates all two-wheeled vehicle kickstands regardless of the end configurations of the kickstand.

SUMMARY OF THE INVENTION

The present invention relates to a device for maintaining a two-wheeled vehicle in the upright position when placed between the two-wheeled vehicle kickstand and the supporting surface.

One embodiment of the present invention utilizes a solid planar member having flat surfaces. A plurality of reinforcing members are disturbed throughout the member such that the member supports the weight of the two-wheeled vehicle and contributes to the resilient property of the member.

In accordance to a further aspect of the present invention, means are provided for securing the device to another portion of the two-wheeled vehicle when not in use.

In accordance with a still further aspect of the present invention, means are provided which allows the device to be slipped into and out of secure attachment as required with another portion of the two-wheeled vehicle.

Accordingly it is an objective of a present invention to provide a device which maintains a two-wheeled vehicle in the upright position when placed between a soft supporting surface such as soft earth, mud, sand, hot asphalt, lawn or turf, beach or desert sand etc. and the two-wheeled vehicle kickstand.

It is another objective of the present invention to provide a device which maintains a two-wheeled vehicle in the upright position when placed between the kickstand and the supporting surface which can be easily stored on the two-wheeled vehicle when not in use yet will not dent, mar, or scratch the two-wheeled vehicle.

It is a further objective of the present invention to provide a device which maintains a two-wheeled vehicle in the upright position when placed between the kickstand and a soft supporting surface which is relatively resistant to hot and cold extremes and other elements such as mud, rain, snow, etc.

It is yet a further objective of the present invention to provide a device which maintains a two-wheeled vehicle in the upright position when placed between the kickstand and a soft supporting surface which can be carried on the operator's person such as, in the operator's back or breast pocket.

It is still yet another objective of the present invention to provide a device which maintains a two-wheeled vehicle in the upright position when placed between the kickstand and a soft supporting surface which prevents the vehicle kickstand from sinking into hot asphalt, soft earth, sand, mud or other soft surfaces.

It is yet a further objective of the present invention to provide a device for maintaining a two-wheeled vehicle in the upright position when placed between the kickstand and soft supporting surface which is simple and inexpensive to manufacture and distribute.

It is still a further objective of the present invention to provide a device for maintaining a two-wheeled vehicle in the upright position when placed between the kickstand and a soft supporting surface which can be used without modification with all two-wheeled vehicle kickstands.

It is yet a further object of the present invention to provide a device which maintains a two-wheeled vehicle in the upright position in which said device can be utilized for all two-wheeled vehicles including bicycles, motorcycles, etc.

Further objectives and advantages of the present invention will become apparent with the following description of the preferred embodiment, the claims and the attached drawings.

BRIEF DESCRIPTION OF THE DRAWINGS

In the following detailed description of the embodiment of the preferred embodiment, references made to the accompanying drawings, in which:

FIG. 1 is a perspective view of a device for supporting a two-wheeled vehicle.

FIG. 2 is a fragmentary view of the device illustrated hanging from a cord or leather loop attached to the two-wheeled vehicle.

FIG. 3 is a fragmentary perspective view of the device attached to a motorcycle transmission cable when not in use.

FIG. 4 is a top planar view of the device.

FIG. 5 is a sectional view taken along line 4—4 of FIG. 4.

While the invention will be described in connection with the preferred embodiment, it will be understood that it is not intended to limit the invention to that embodiment. On the contrary, it is intended to cover all alternatives, modifications and equalivalents as may be included within the spirit and scope of the invention as defined by the appended claims.

DETAILED DESCRIPTION OF THE INVENTION

The following will be directed to particular elements forming part of or cooperating directly with, the present invention. Elements not specifically shown or described herein are understood to be selected from those known in the art.

Referring now to the drawings, one embodiment for supporting a kickstand of a two-wheeled vehicle on soft surface or supporting device according to the present invention, generally designated as 10 is illustrated. Device 10 is operatively associated with a conventional two-wheeled vehicle kickstand 12 used to maintain the two-wheeled vehicle in the upright position when the two-wheeled vehicle is not being operated.

As best illustrated in FIGS. 1, 4, and 5, means are provided for supporting a two-wheeled vehicle kickstand on a soft surface. In the embodiment illustrated, this comprises a thin square or rectangular planar member or device 10. Device 10 preferably composed of PVC 225 (polyvinylchloride 225) is made durable yet resilient enough to mold and/or shape itself to the surface on which the two-wheeled vehicle is to be maintained in the upright position while providing a non-skid resting point for the two-wheeled vehicle kickstand by means for reinforcing 18 located between top surface 20 and bottom surface 22 of device 10 such that means for reinforcing 18 gives device 10 the ability to distribute the weight of the two-wheeled vehicle over the entire surface of device 10.

Means are provided for storing device 10 on a two-wheeled vehicle. In the embodiment illustrated this consists of void or aperture 14 and slit 16 connecting aperture 14 to the periphery of device 10. As best illustrated by FIGS. 2 and 3, means for storing or aperture 14 and slit 16 are utilized to secure device 10 to cable 26 or cord or leather loop 24.

Device 10 may be manufactured out of hard rubber, plastic or any other suitable material, with the preferred embodiment, as stated above, being made of PVC 225 and being manufactured by a die cut or injection molding process.

As stated above, FIG. 1 illustrates the use of the invention or standpad 10 and shows the illustrated two-wheeled vehicle at rest. The kickstand 12 is adapted to support the vehicle at rest and forms with the two wheels a three point support system. During utilization of device 10, kickstand 12 contacts device 10 at point 28. The kickstand support base 32 at the end of kickstand 12 is the portion of the kickstand 12 which actually contacts device 10. Standpad 10 increases the area contacting the soft supporting surface 30 for kickstand 12 point of center 28.

As best illustrated by FIGS. 4 and 5, device 10 is shown in detail. Top surface 20 and bottom surface 22 are substantially the same. This enables device 10 to be utilized with either surface 20 or 22 being in contact with soft support base 32 at point of contact 28.

As illustrated in FIGS. 2 and 3, when device is not needed to form the three point support system, it can be stored in a convenient manner such as on the speedometer cable, the mirror post, the clutch cable atop the transmission, or a loop of cord or leather attached to the two-wheeled vehicle in a convenient location. One significant advantage of device 10 over the prior art devices is that device 10 requires no attaching means to kickstand 12. In other words, contact point 28 as illustrated in FIG. 1, could be a variety of places on the surfaces of device 10 but is preferably near the center of mass of device 10. Several prior art devices have structure designed specifically for attaching the support pad directly to the two-wheeled vehicle kickstand. The elimination of this structure which allows one device 10 to be used with all kickstands is a significant feature of the present invention.

As stated earlier the embodiment of FIGS. 1–5 is preferably die cut or injected molded of PVC 225. This material and method of production, in addition to lowering cost and increasing accuracy during production of the standpad thus lowering the ultimate selling price to the consumer, provides a device 10 which will not scratch, dent or mar the surface of the two-wheeled vehicle.

During operation, device 10 is conveniently stored on the two-wheeled vehicle as illustrated in FIGS. 2 and 3 or in the pocket or elsewhere on the person of the operator. To put device 10, in use, the vehicle operator reaches down to the top of the transmission or whatever area on the two-wheeled vehicle device 10 is stored on with one hand takes it from his pocket or some other convenient storing place either on his person or on the two wheeled vehicle. Next, the operator drops device 10 on soft surface 30 by literally throwing it on surface 30. The operator adjusts device 10 with one foot into the desired position on soft surface 30 until one surface, either 20 or 22, of device 10 is directly beneath support base 32 of kickstand 12. After properly locating device 10 beneath kickstand base 32 of kickstand 12, as illustrated in FIG. 1 the two-wheeled vehicle (not shown) is lowered gently toward one surface 20 or 22 until kickstand base 32 and device 10 contact at point 28 or any other convenient point on the surface 20 or 22 of device 10. Once this contact point 28 is made, the operator releases control of the two-wheeled vehicle. After release, the two-wheeled vehicle is supported in the upright position by a three point support system consisting of the two wheels of the two-wheeled vehicle and kickstand 12 contacting device 10 at point 28 being located between kickstand 12 and soft supporting surface 30.

In order to operate the two-wheeled vehicle, it is necessary to reverse the above process. When the operator desires to operate the vehicle, the operator merely grasps the two-wheeled vehicle and moves it toward the perpendicular position, returns kickstand 12 to its at rest position along side the frame of the two-wheeled vehicle, reaches down with the one hand and retrieves device 10, replaces it on cord or leather loop 24 or cable 26 located it on top of transmission 34 or places in a breast pocket, hip pocket or saddle bag of the two-wheeled vehicle and mounts and starts the two-wheeled vehicle as necessary and then rides to the the next destination.

Thus, it is apparent that there has been provided, in accordance with the present invention, a device that fully satisfies the objects, aims, and advantages setforth above. While the invention has been described in conjunction with a specific embodiment thereof, it is evident that many alternatives, modifications, and variations will be apparent to those skilled in the art in light of the foregoing description. Accordingly, it is intended to embrace all such alternatives, modifications, and veriations as fall within the spirit and scope of the appended claims.

What is claimed is:

1. A device for maintaining two-wheeled vehicles having a kickstand in the upright position on soft supporting surfaces, said device comprising:
   a thin resilient, planar member, having at least two sides, each side of said member being equally capable of supporting said vehicles;
   means for reinforcing said planar member for preventing said kickstand from sinking into said soft supporting surface.

2. The device of claim 1 further comprising:
   means for attaching said device to said two-wheeled vehicle when said device is not required to maintain said two-wheeled vehicle in said upright position, said device being attached to said vehicle at a point removed from said kickstand.

3. The device of claim 2, said means for attaching further comprising:
   an aperture formed in said planar member, said aperture being located proximate to the periphery of said device; and
   a slit, said slit connecting said aperture with said periphery of said planar member such that said device can be securably but releasably attached to said two-wheeled vehicle.

4. The device of claim 1, said means for reinforcing further comprising:
   reinforced plastic, said reinforced plastic being distributed throughout said thin planar member.

5. The device of claim 1, said means for reinforcing further comprising:
   textile like threads, said threads being woven, said threads being centrally located between the top and bottom surfaces of said thin planar member.

6. The device of claim 1, wherein said thin planar member is composed of Polyvinylchloride 225.

7. The device of claim 5, wherein said threads are nylon.

8. A device for maintaining two-wheeled vehicles having a kickstand in the upright position on soft supporting surfaces, said device comprising:
   a thin resilient, non-slippery, resistant to extremes of temperatures, planar member being composed of polyvinylchloride 225 and having at least two surfaces capable of supporting said vehicle;
   means for reinforcing said planar member being:
   nylon textile threads approximately centrally located between the top and bottom surface of said thin planar member; and
   means for attaching said device to said two-wheeled vehicle when said device is not being utilized in supporting said two-wheeled vehicle in the upright position being:
   a circular aperture being located proximate to the periphery of said device; and
   a slit, between the periphery and said aperture such that said device can be secureably but releasably attached to said two-wheeled vehicle.

* * * * *